United States Patent
Lee et al.

(10) Patent No.: US 8,808,126 B2
(45) Date of Patent: Aug. 19, 2014

(54) DRIVING DEVICE FOR AUTOMATIC TRACKING OPERATION OF SOLAR PANEL FOR SOLAR POWER GENERATOR

(75) Inventors: Yong Heun Lee, Seoul (KR); Kwan Jae Lee, Seoul (KR)

(73) Assignees: Hankuk Relay Co., Ltd., Incheon (KR); Yong Heun Lee, Mapo-gu, Seoul (KR); Kwan Jae Lee, Mapo-gu, Seoul (KR)

( * ) Notice: Subject to any disclaimer, the term of this patent is extended or adjusted under 35 U.S.C. 154(b) by 604 days.

(21) Appl. No.: 13/215,476

(22) Filed: Aug. 23, 2011

(65) Prior Publication Data
US 2012/0240974 A1    Sep. 27, 2012

(30) Foreign Application Priority Data
Mar. 24, 2011 (KR) .................. 10-2011-0026257

(51) Int. Cl.
*F16H 3/72* (2006.01)
*F24J 2/52* (2006.01)
*H01L 31/042* (2014.01)
*F24J 2/54* (2006.01)

(52) U.S. Cl.
CPC .......... *F24J 2/5264* (2013.01); *H01L 31/0422* (2013.01); *Y02E 10/50* (2013.01); *F24J 2002/5462* (2013.01); *Y02E 10/47* (2013.01); *F24J 2/5406* (2013.01)
USPC ................................ 475/7; 475/333; 136/246

(58) Field of Classification Search
USPC .............. 475/7, 228, 304, 333; 136/246
See application file for complete search history.

(56) References Cited

U.S. PATENT DOCUMENTS

| | | | |
|---|---|---|---|
| 4,994,001 A * | 2/1991 | Wilkinson et al. ................ | 475/4 |
| 5,002,341 A * | 3/1991 | Braun et al. ...................... | 475/7 |
| 7,041,022 B2 * | 5/2006 | Bock et al. ........................ | 475/7 |
| 8,242,350 B2 * | 8/2012 | Cashion et al. ............... | 136/246 |
| 8,490,859 B1 * | 7/2013 | Master et al. .................. | 232/39 |

* cited by examiner

*Primary Examiner* — Derek D Knight
(74) *Attorney, Agent, or Firm* — John K. Park; Park Law Firm

(57) ABSTRACT

Disclosed is a driving device for an automatic tracking operation of a solar panel for a solar power generator. The device includes a housing, a worm gear, and upper and lower ring bearings. The worm gear is coupled to a worm mounted to a worm shaft, and a rotary gear is connected to an end of the worm shaft to engage with a drive gear. A thrust bearing is mounted on an upper portion of the upper ring bearing, and an anchor plate and an upper casing are installed above the thrust bearing. A support plate and a lower casing are coupled to a lower portion of the lower ring bearing. First and second stoppers are securely provided on a bearing body of the lower ring bearing to touch first and second limit switches. The solar panel is supported on the housing via a panel support bracket.

5 Claims, 9 Drawing Sheets

DRIVING DEVICE FOR AUTOMATIC TRACKING OPERATION OF SOLAR PANEL FOR SOLAR POWER GENERATOR

BACKGROUND OF THE INVENTION

1. Field of the Invention

The present invention relates generally to a driving device for an automatic tracking operation of a solar panel for a solar power generator and, more particularly, to a driving device for an automatic tracking operation of a solar panel for a solar power generator, which drives a solar panel to make the solar panel face the sun depending on the solar orbit, namely, a change in solar azimuth angle, thus being capable of more efficiently receiving sunlight.

2. Description of the Related Art

Generally, solar power generation is technology that converts sunlight into electrical energy, and uses the photoelectric effect of a solar cell to generate a photoelectron-motive force. Solar power generation is advantageous in that the energy source is clean, maintenance is easy, and automation is possible.

In order to enhance a sunlight concentrating effect, a driving device is required to move a solar panel according to a change in solar orbit and thereby cause the solar panel to face the sun. However, a conventional driving device for a solar panel is problematic in that it has a weak driving force, is low in carrying capacity, has a complicated construction, and the driving effect cannot be made precise.

Therefore, it is difficult to drive the solar panel when the wind is blowing or a typhoon has developed. Further, it is difficult to install a solar panel of a larger capacity and to obtain a precise driving effect, so that accuracy of a tracking operation according to the change in solar azimuth angle is low. Thereby, when a malfunction occurs during the driving operation, safety cannot be ensured.

SUMMARY OF THE INVENTION

Accordingly, the present invention has been made keeping in mind the above problems occurring in the prior art, and an object of the present invention is to provide a driving device for an automatic tracking operation of a solar panel for a solar power generator, which drives a solar panel to make the solar panel face the sun depending on the solar orbit, namely, a change in solar azimuth angle, thus being capable of more effectively receiving sunlight, ensuring safety during a driving operation, improving the accuracy of a tracking operation according to the change in solar azimuth angle due to the precise driving operation, and carrying a solar panel of a larger capacity.

In order to accomplish the above object, there is provided a driving device for an automatic tracking operation of a solar panel for a solar power generator, which is intended to drive the solar panel to make the solar panel face the sun in accordance with a solar orbit, the driving device including a housing shaped like a rectangular casing, and a worm gear provided in the housing and secured to a support shaft. The worm gear includes a holder fastening band, a worm wheel, and a worm gear band, which are assembled with each other. The holder fastening band is fastened to the support shaft via a plurality of fastening bolts, and is made of a metal material. The worm wheel is coupled to an outer portion of the holder fastening band, and is made of a synthetic resin. The worm gear band is coupled to a circumference of the worm wheel, includes worm gear holes and idling holes to engage with a worm, and is made of a metal material.

An upper ring bearing may be mounted to an upper portion of the worm gear, while a lower ring bearing may be mounted to a lower portion of the worm gear. Each of the upper and lower ring bearings may include a bearing body fitted over the support shaft and made of a synthetic resin, with an insertion groove being formed in an outer portion of the bearing body; and a ring-type rolling element fitted into the insertion groove to rotate along with the housing and made of a synthetic resin.

The worm gear may be coupled to a worm to engage with the worm mounted to a worm shaft, a rotary gear may be connected to an end of the worm shaft, a drive gear mounted to a motor shaft of the drive motor may engage with the rotary gear, and the worm and the drive motor may be fastened to the housing via a fastening bracket.

A thrust bearing may be mounted on an upper portion of the upper ring bearing, and an anchor plate and an upper casing may be installed above the thrust bearing.

A support plate and a lower casing may be coupled to a lower portion of the lower ring bearing, with first and second limit switches being securely coupled to the support plate.

First and second stoppers may be securely provided on a bearing body of the lower ring bearing to touch the first and second limit switches A coupling groove may be formed in an outer circumference of the housing, and a panel support bracket may be fastened by a fastening bolt and a fastening nut in the coupling groove to support the solar panel.

As is apparent from the above description, the driving device according to the present invention is advantageous in that the solar panel is driven to face the sun depending on a solar orbit (namely, a change in solar azimuth angle), thus enabling sunlight to be more effectively received and thereby enhancing power generating efficiency of the solar panel, and which ensures safety during the driving operation of the driving device, so that the precise driving operation improves the accuracy of the tracking operation depending on the change in solar azimuth angle.

Further, the driving device according to the present invention is advantageous in that it is coupled to a support shaft to be driven around the support shaft, so that the driving device can be resistant to a strong typhoon or winds and the solar panel of a larger capacity can be installed, and thereby power generating efficiency can be maximized.

Furthermore, the driving device according to the present invention is advantageous in that it can be coupled to a horizontal-type support shaft as well as a vertical-type support shaft.

BRIEF DESCRIPTION OF THE DRAWINGS

The above and other objects, features and advantages of the present invention will be more clearly understood from the following detailed description taken in conjunction with the accompanying drawings, in which:

FIGS. 5 and 6 are sectional views taken along line B-B of FIG. 3 to illustrate the operation of the present invention, in which FIG. 5 shows a state before sunrise, and FIG. 6 shows a state after sunset;

DESCRIPTION OF THE PREFERRED EMBODIMENTS

Figure 1:
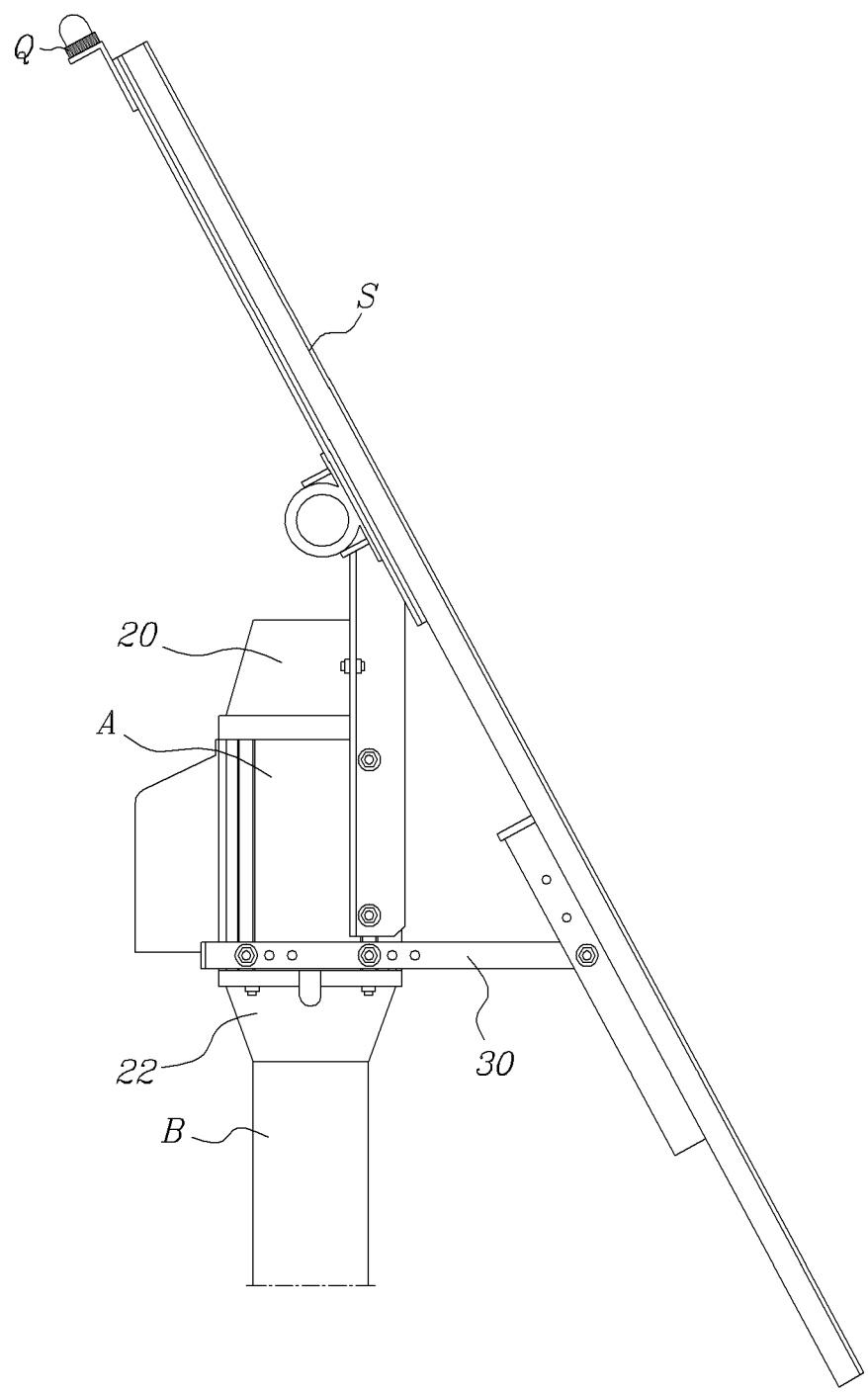
FIG. 1 is an outside view illustrating a use of a driving device for an automatic tracking operation of a solar panel for a solar power generator in accordance with the present invention.
Figure 2:
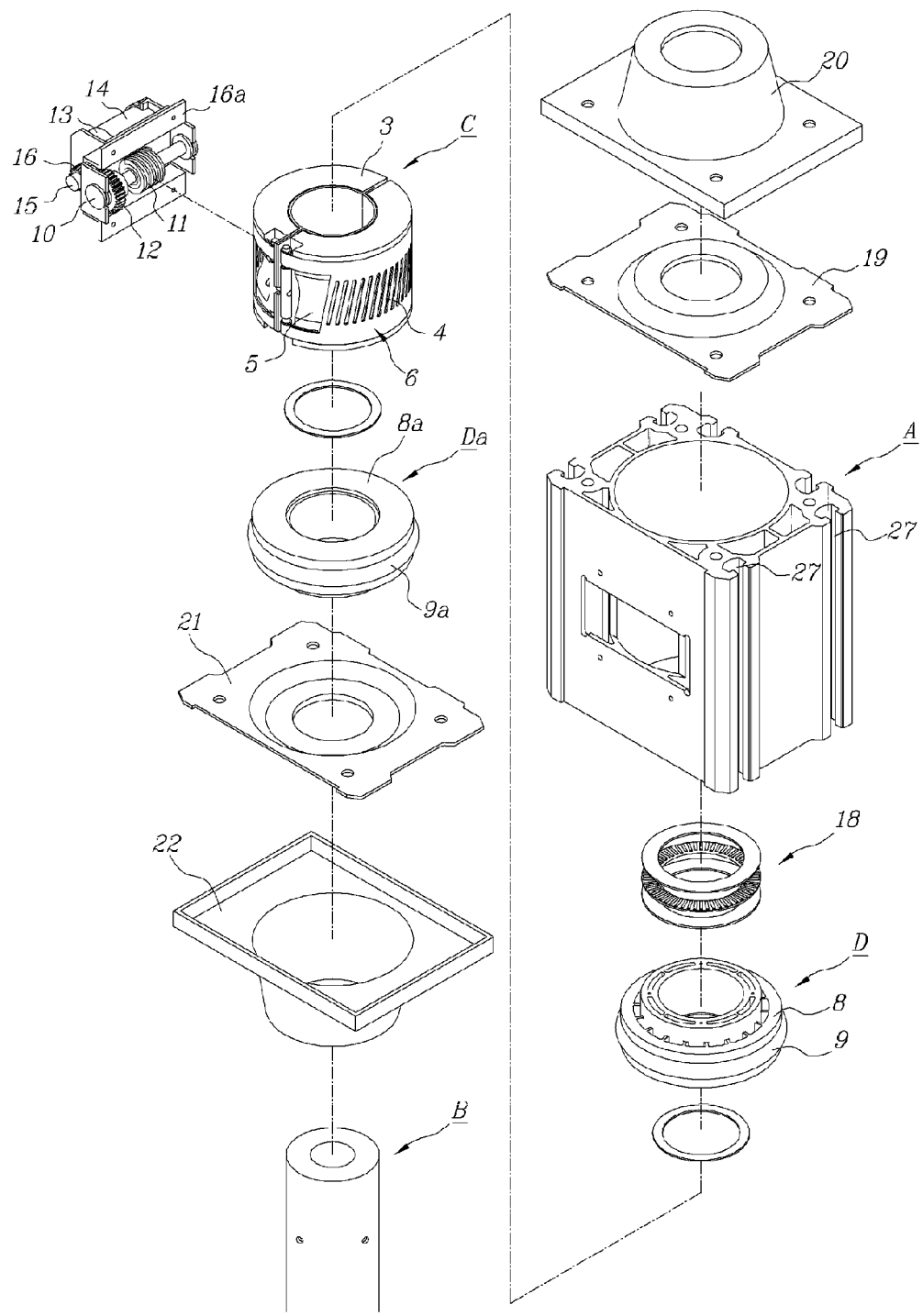
FIG. 2 is an exploded view showing the driving device for the automatic tracking operation of the solar panel for the solar power generator in accordance with the present invention.
Figure 3:
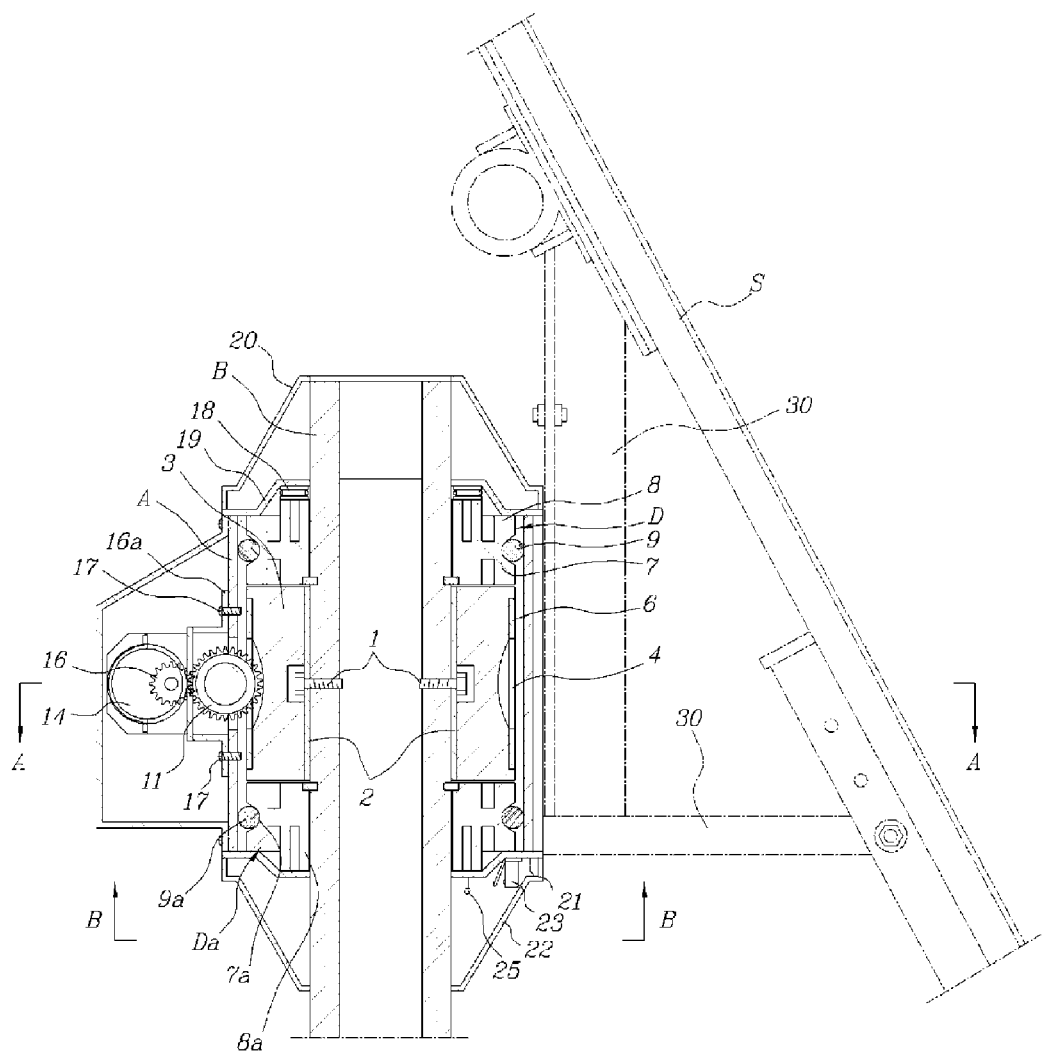
FIG. 3 is a sectional view showing the assembled state of the driving device for the automatic tracking operation of the solar panel for the solar power generator in accordance with the present invention.
Figure 4:
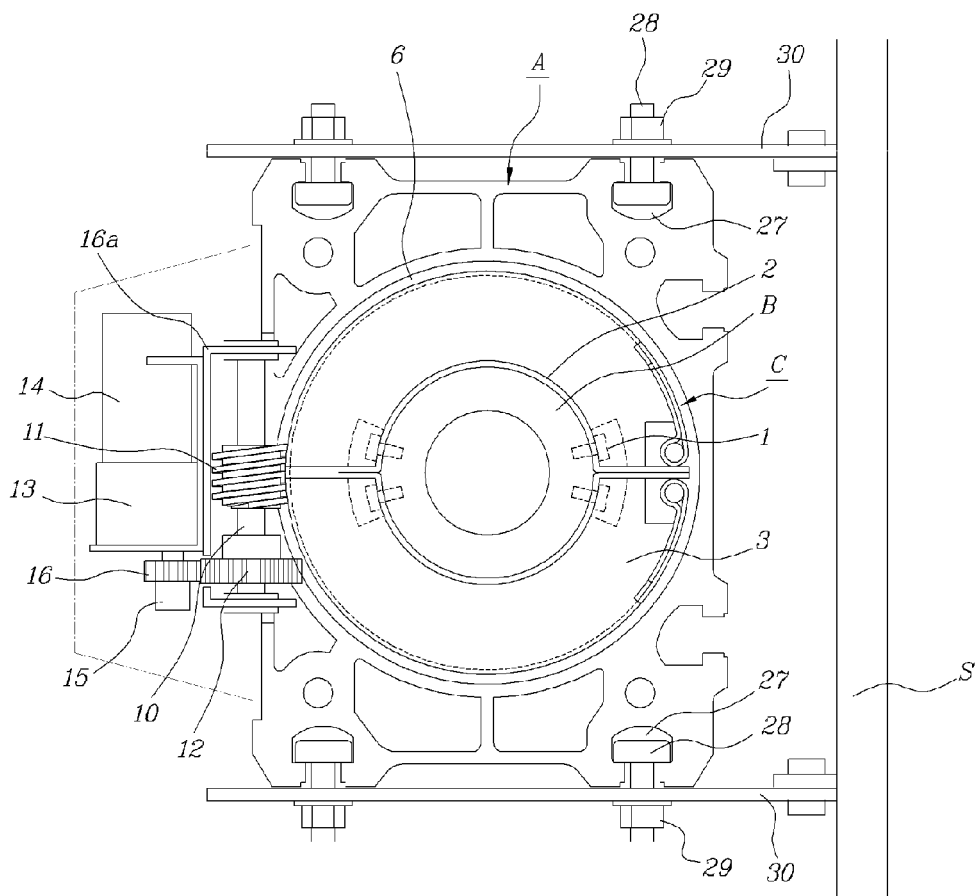
FIG. 4 is a sectional view taken along line A-A of FIG. 3.

Hereinafter, a preferred embodiment will be described in detail with reference to the accompanying drawings.

First, the specific embodiment of the present invention will be described with reference to FIGS. 1 to 5.

The terms used in the description of the present invention are defined in consideration of the function or form of the present invention, and should not be interpreted as limiting technical components of the present invention.

The present invention may be variously changed and may have various forms, so that aspects or embodiments of this invention will be described in detail herein. However, it is to be understood that the invention is not limited by any of the details of the aspects or embodiments, unless otherwise specified, and that various changes and modifications may be made in the invention without departing from the spirit and scope thereof.

Further, for the sake of providing a better understanding of the invention, the size or thickness of components shown in respective drawings may not be illustrated to scale and may be simply expressed. However, the specific embodiments shown in the drawings should not be interpreted as limiting the invention.

Terms used herein are merely used to explain specific aspects or embodiments, and are not intended to limit the present invention.

The meaning of terms or words generally defined in the dictionary should be interpreted as being consistent with those of a related skill in the context, and should not be interpreted otherwise as long as the terms or words are not defined specifically herein.

As shown in FIGS. 1 to 5, a driving device according to the present invention drives a solar panel to make the solar panel face the sun depending on the solar orbit, namely, a change in solar azimuth angle, and includes a housing A shaped like a rectangular casing.

The housing A is made of a metal material, and is usually manufactured by extrusion in an easy and inexpensive fashion.

Further, a worm gear C is provided in the housing A and is secured to a support shaft B.

The worm gear C includes a holder fastening band 2, a worm wheel 3, and a worm gear band 6, which are assembled with each other. The holder fastening band 2 is fastened to the support shaft B via a plurality of fastening bolts 1, and is made of a metal material. The worm wheel 3 is coupled to an outer portion of the holder fastening band 2, and is made of a synthetic resin. The worm gear band 6 is coupled to a circumference of the worm wheel 3, includes worm gear holes 4 and idling holes 5 to engage with a worm, and is made of a metal material.

An upper ring bearing D is mounted to an upper portion of the worm gear C, while a lower ring bearing Da is mounted to a lower portion of the worm gear C. Each of the upper and lower ring bearings D and Da is fitted over the support shaft B.

The upper ring bearing D and the lower ring bearing Da include bearing bodies 8 and 8a, respectively. The bearing bodies 8 and 8a are made of a synthetic resin, with insertion grooves 7 and 7a being formed in outer circumferences of the bearing bodies 8 and 8a, respectively. Ring-type rolling elements 9 and 9a made of a synthetic resin are inserted, respectively, into the insertion grooves 7 and 7a of the bearing bodies 8 and 8a. The rolling elements 9 and 9a come into close contact with an inner wall of the housing A to rotate along with the housing A.

The bearing bodies 8 and 8a of the upper and lower ring bearings D and Da are made of a synthetic resin such as acetal resin, while the ring-type rolling elements 9 and 9a thereof are made of a synthetic resin such as Teflon. Thereby, the upper and lower ring bearings D and Da are light in weight, are excellent in heat-resistance and cold-resistance, and have a low coefficient of friction, so that the bearings D and Da are suitable for low-speed rotation, in addition to being suitable for use even in places where there is a large temperature difference.

A worm 11 mounted to a worm shaft 10 is coupled to the worm gear C to engage with the worm gear holes 4 thereof. A rotary gear 12 is connected to an end of the worm shaft 10, and engages with a drive gear 16 mounted to a motor shaft 15 of a drive motor 14 having a reduction gear 13.

The worm 11 and the drive motor 14 are fastened to the housing A using a fastening bracket 16a and fastening bolts 17.

A trust bearing 18 is mounted to an upper portion of the upper ring bearing D, and an anchor plate 19 and an upper casing 20 are installed above the through bearing 18.

A support plate 21 and a lower casing 22 are coupled to a lower portion of the lower ring bearing Da, and a first limit switch 23 and a second limit switch 24 are fixedly coupled to the support plate 21.

Further, first and second stoppers 25 and 26 are fixedly provided on the bearing body 8a of the lower ring bearing Da to touch the first and second limit switches 23 and 24, respectively.

Coupling grooves 27 are formed in an outer circumference of the housing A, so that a panel support bracket 30 is fastened to the housing A by a fastening bolt 28 and a fastening nut 29 in each coupling groove 27, thus allowing the solar panel S to be set up.

The driving device of the present invention constructed as described above is operated as follows.

Figure 9A:
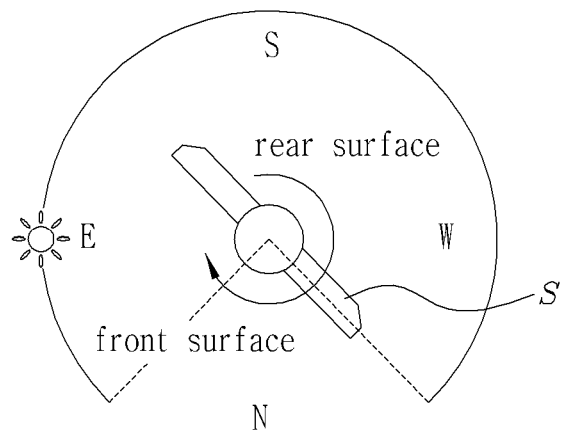
FIGS. 9A to 9C are views showing an operation of the driving device for the automatic tracking operation of the solar panel for the solar power generator in accordance with the present invention, depending on a solar azimuth angle.
Figure 9B:
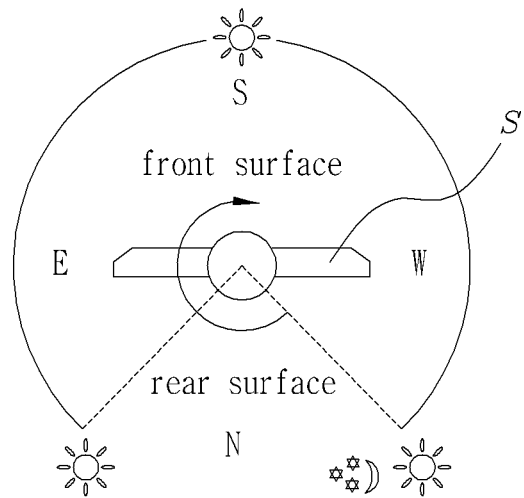
Figure 9C:
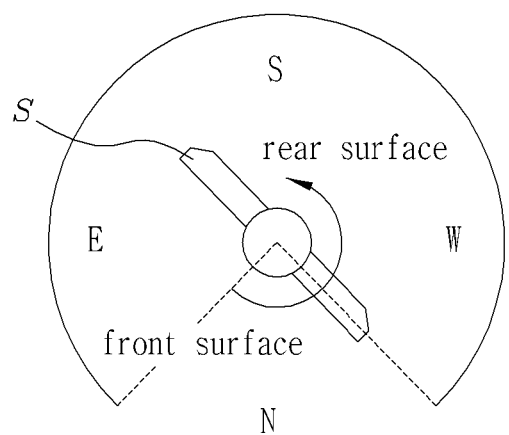

As shown in FIGS. 9A to 9C, the sun rises in the east and sets in the west every day in the case of the northern part of the earth (the sun rises in the west and sets in the east in the case of the southern part of the earth). Thus, if the solar panel S accurately detects and tracks the movement of the sun, that is, a change in solar azimuth angle to always face the sun, power generating efficiency of the solar panel S can be increased.

In order to increase the power generating efficiency of the solar panel S, the driving device of the present invention rotates the solar panel S depending on a change in solar azimuth angle as the sun moves, thus allowing the solar panel S to always face the sun.

When the sun rises and moves along a solar orbit, an automatic sunlight tracking sensor Q (see FIG. 1) detects sunlight and the drive motor 14 is driven based on a command of a circuit device (not shown) provided in a circuit board (not shown).

As the drive motor 14 is driven, a driving force is transmitted through the reduction gear 13 to the drive gear 16 so as to drive the drive gear 16. As the drive gear 16 is driven, the driving force is sequentially transmitted to the rotary gear 12, the worm shaft 10, the worm 11 and the worm gear C.

In this case, since the worm gear C is fastened to the support shaft B via the plurality of fastening bolts 1, the worm gear C cannot be rotated. The worm 11 is fastened to an outer wall of the housing A using the fastening bracket 16*a* and the fastening bolts 17.

Thus, the worm 11 moves while rotating along the worm gear holes 4 formed in the worm gear band 6 of the worm gear C.

That is, while the worm 11 rotates, it simultaneously revolves along the worm gear holes 4 formed in the worm gear band 6. At this time, all of the housing A, the anchor plate 19, the upper casing 20, the support plate 21 and the lower casing 22 rotate starting from the ring-type rolling elements 9 and 9*a* of the upper and lower ring bearings D and Da. Simultaneously, the solar panel S connected to the housing A by the panel support bracket 30 is also rotated.

In other words, only the worm gear C, the bearing bodies 8 and 8*a* of the upper and lower ring bearings D and Da, and the support shaft B are not rotated, and components other than the above-mentioned components are rotated, thus rotating the solar panel S.

Thus, the solar panel S always faces the sun as the sun moves.

Such a driving device of the present invention is driven from sunrise to sunset. When the sun sets, the driving device stops operation along with the sun.

That is, in the case of the sunset, the automatic sunlight tracking sensor Q detects the sunset and causes the drive motor 14 to stop driving based on a command of the circuit device (not shown). However, in the event of the occurrence of an unexpected matter, for example, wrong detection, the drive motor 14 may not stop driving but may continue to operate even after sunset.

Figure 5:
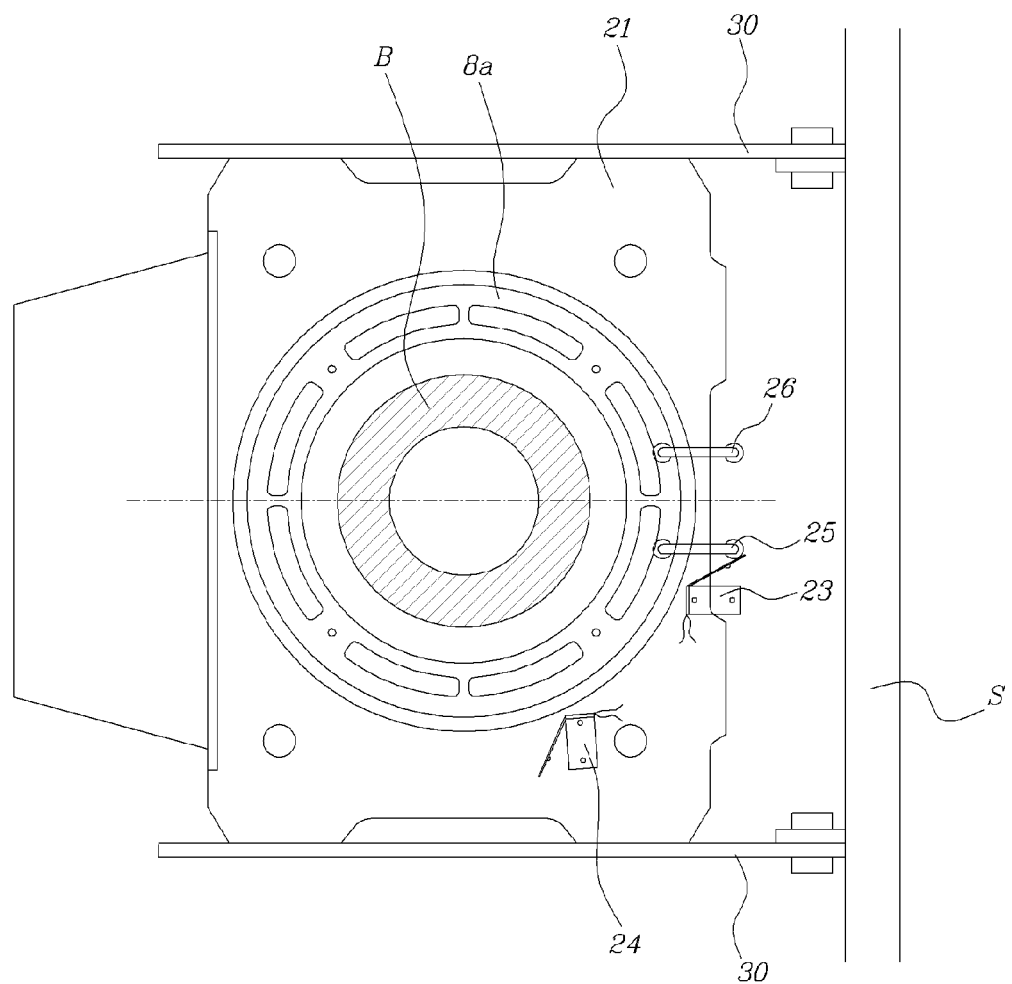

In this case, for the purpose of safe operation, in the state in which the first limit switch 23 touches the first stopper 25 (the sun is set, the drive motor is stopped, and the driving device is ready to operate before the sun rises) as shown in FIG. 5, if the sun rises as shown in FIG. 9A, the sunrise is detected by the automatic sunlight tracking sensor Q, and thereby the drive motor 14 starts driving based on a command of the circuit device (not shown).

Figure 6:
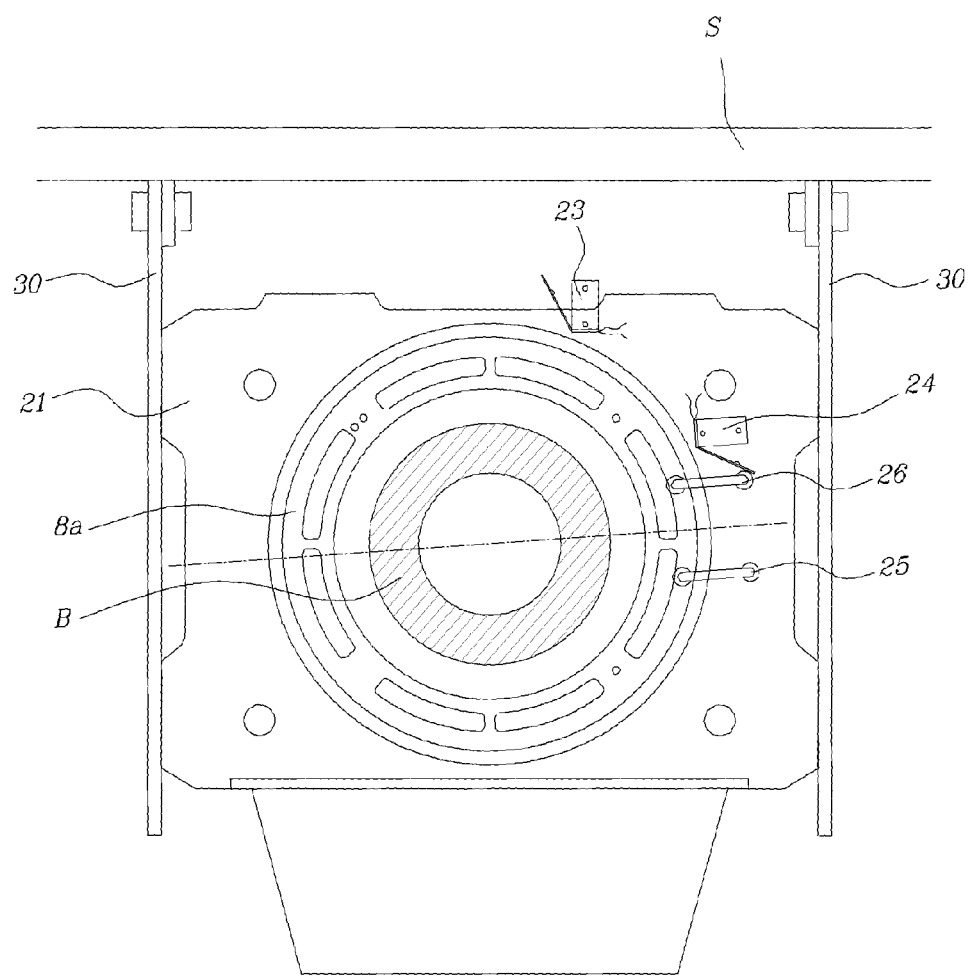
Figure 7:
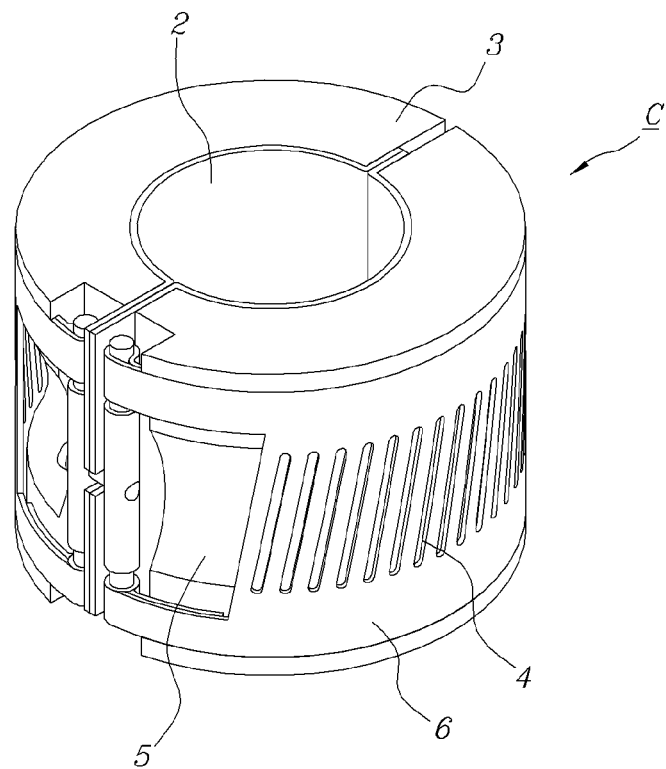
FIG. 7 is an enlarged perspective view showing a worm gear included in the driving device for the automatic tracking operation of the solar panel for the solar power generator in accordance with the present invention.
Figure 8:
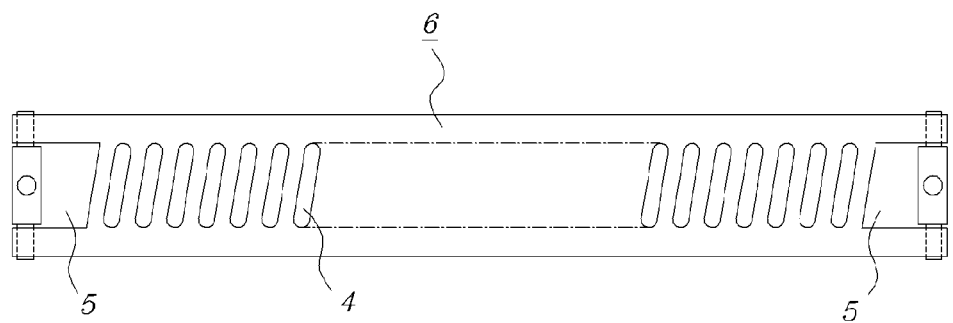
FIG. 8 is a development view showing a worm gear band constituting the worm gear of the driving device for the automatic tracking operation of the solar panel for the solar power generator in accordance with the present invention.

In this case, as described above in detail, the bearing body 8*a* equipped with the first and second stoppers 25 and 26 is fixed, and the support plate 21 and the solar panel S rotate along the solar orbit. If the sun sets as shown in FIG. 9C, the second limit switch 24 touches the second stopper 26 as shown in FIG. 6, so that the drive motor 14 stops driving and simultaneously the drive motor 14 is driven again in reverse.

At this time, all the components rotating forwards, that is, the drive gear 16, the rotary gear 12, the worm shaft 10 and the worm 11, the housing A, the anchor plate 19 and the upper casing 20, the support plate 21 and the lower casing 22 rotate in reverse starting from the ring-type rolling elements 9 and 9*a* of the upper and lower ring bearings D and Da. Simultaneously, the solar panel S connected to the housing A via the panel support bracket 30 also rotates in reverse to return to its original state. Thereby, if the first limit switch 23 touches the first stopper 25 again as shown in FIG. 5, the drive motor 14 stops driving and the solar panel S returns to its original position. In this state, the driving device makes preparations for the next day.

Meanwhile, the idling holes 5 are formed in both sides of the worm gear band 6 which is coupled to the worm wheel 3 and is made of a metal material. Thus, even if the worm 11 is over-rotated by the drive motor 14, the worm 11 is inserted into the idling hole 5 to perform an idle rotation, so that the transmission of the rotating force of all components connected to the worm 11 as well as the worm 11 is interrupted and the components stop rotating. Therefore, larger safety can be ensured.

Since the bearing bodies 8 and 8*a* are made of a synthetic resin such as acetal resin and the ring-type rolling elements 9 and 9*a* are made of a synthetic resin such as Teflon, the bearings D and Da are light in weight, excellent in heat resistance and cold resistance, and has a low coefficient of friction. Thereby, the bearings D and Da are suitable for low-speed rotation for the driving device for the automatic tracking operation of the solar panel according to the present invention, in addition to being suitable for use even in places where there is a large temperature difference.

Further, the synthetic resin prevents corrosion, so that the device is suitable for even locations where there is a lot of moisture or salt. Contact areas between the ring-type rolling elements 9 and 9*a* and the insertion grooves 7 and 7*a* are large, so that pressure is dispersed, thus preventing each bearing body from being broken or damaged. Further, the coefficient of friction is low, so that a loss of driving force is minimized.

The thrust bearing 18 mitigates vertical load exerted by load of the solar panel S, and allows the anchor plate 19 and the upper casing 20 to rotate smoothly.

Further, when length of the panel support bracket 30 is adjusted by the fastening bolt 28 and the fastening nut 29 provided in each coupling groove 27 formed in the outer circumference of the housing A, so that an inclination angle of the solar panel S is adjusted, the solar panel S can accurately face the sun depending on the solar altitude. Thereby, the solar panel S can more effectively receive sunlight, so that power generating efficiency of the solar panel S can be maximized.

That is, even though the solar altitude changes depending on the season or region, the solar panel S is aligned with the solar altitude to accurately face the sun, thus being capable of more effectively receiving sunlight.

As described above, the present invention provides a driving device for an automatic tracking operation of a solar panel for a solar power generator, in which the solar panel S is driven to face the sun depending on a solar orbit (namely, a change in solar azimuth angle), thus enabling sunlight to be more effectively received and thereby enhancing power generating efficiency of the solar panel S, and which ensures safety during the driving operation of the driving device, so that the precise driving operation improves the accuracy of the tracking operation depending on the change in solar azimuth angle.

Further, the present invention provides a driving device for an automatic tracking operation of a solar panel for a solar power generator, which is coupled to a support shaft to be driven around the support shaft, so that the driving device can be resistant to a strong typhoon or winds and the solar panel of a larger capacity can be installed, and thereby power generating efficiency can be maximized.

Furthermore, the present invention provides a driving device for an automatic tracking operation of a solar panel for a solar power generator, which can be coupled to a horizontal-type support shaft as well as a vertical-type support shaft.

What is claimed is:

1. A driving device for an automatic tracking operation of a solar panel for a solar power generator, driving the solar panel to make the solar panel face the sun in accordance with a solar orbit, the driving device comprising:
   a housing shaped like a casing;
   a worm gear provided in the housing and secured to a support shaft; and
   upper and lower ring bearings, the upper ring bearing being mounted to an upper portion of the worm gear, the lower ring bearing being mounted to a lower portion of the worm gear,
   wherein the worm gear is coupled to a worm to engage with the worm mounted to a worm shaft, a rotary gear is connected to an end of the worm shaft, a drive gear mounted to a motor shaft of the drive motor engages with the rotary gear, and the worm and the drive motor are fastened to the housing via a fastening bracket,
   a thrust bearing is mounted on an upper portion of the upper ring bearing, and an anchor plate and an upper casing are installed above the thrust bearing,
   a support plate and a lower casing are coupled to a lower portion of the lower ring bearing, with first and second limit switches being securely coupled to the support plate,
   first and second stoppers are securely provided on a bearing body of the lower ring bearing to touch the first and second limit switches, and
   the solar panel is supported on an outer portion of the housing via a panel support bracket.

2. The driving device as set forth in claim 1, wherein the worm gear comprises a holder fastening band, a worm wheel, and a worm gear band that are assembled with each other, the holder fastening band being fastened to the support shaft using a plurality of fastening bolts and being made of a metal material, the worm wheel being coupled to an outer portion of the holder fastening band and being made of a synthetic resin, the worm gear band being coupled to a circumference of the worm wheel, having a worm gear hole and an idling hole to engage with the worm and being made of a metal material.

3. The driving device as set forth in claim 1, wherein each of the upper and lower ring bearings comprises:
   a bearing body fitted over the support shaft and made of a synthetic resin, with an insertion groove being formed in an outer portion of the bearing body; and
   a ring-type rolling element fitted into the insertion groove to rotate along with the housing and made of a synthetic resin.

4. The driving device as set forth in claim 3, wherein the bearing body is made of a synthetic resin such as acetal resin, and the ring-type rolling element is made of a synthetic resin such as polytetrafluoroethylene.

5. The driving device as set forth in claim 1, wherein a coupling groove is formed in an outer circumference of the housing, and a panel support bracket is fastened by a fastening bolt and a fastening nut in the coupling groove to support the solar panel.

* * * * *